United States Patent [19]

Kienitz et al.

[11] Patent Number: 4,821,219

[45] Date of Patent: Apr. 11, 1989

[54] METHOD FOR THE CONTACTLESS MEASURING OF TEMPERATURE WITH A MULTI-CHANNEL PYROMETER

[75] Inventors: Ulrich Kienitz; Christian Schiewe, both of Dresden, German Democratic Rep.

[73] Assignee: VEB Messgeraetewerk "Erich Weinert" Magdeburg, Betrieb des Kombinates, Magdeburg, German Democratic Rep.

[21] Appl. No.: 875,124

[22] Filed: Jun. 17, 1986

[30] Foreign Application Priority Data

Jul. 30, 1985 [DD] German Democratic Rep. .................................... 2791180

[51] Int. Cl.$^4$ .................... G01K 13/06; G01K 15/00; G01N 25/72
[52] U.S. Cl. .................. 364/571.03; 364/557; 374/2; 374/9
[58] Field of Search ............. 374/126, 129, 161, 162, 374/2, 134, 153, 9; 358/113; 364/557, 571

[56] References Cited

U.S. PATENT DOCUMENTS

| | | |
|---|---|---|
| 3,544,710 | 9/1966 | Poos .............................. 358/113 X |
| 4,217,608 | 8/1980 | MacGregor et al. ............ 358/113 |
| 4,218,707 | 8/1980 | Reed et al. ..................... 358/113 |
| 4,355,910 | 10/1982 | Quick et al. .................. 374/162 |
| 4,403,251 | 9/1983 | Domarenok et al. .......... 364/557 X |
| 4,417,822 | 11/1982 | Stein et al. .................... 374/126 X |
| 4,463,437 | 7/1984 | Schenck et al. ............... 364/557 |
| 4,465,382 | 8/1984 | Iuchi et al. ..................... 374/9 |
| 4,551,092 | 11/1985 | Sayler ............................ 374/8 X |
| 4,553,854 | 11/1985 | Yamada et al. ................ 374/129 |
| 4,579,461 | 4/1986 | Rudolph ......................... 374/9 |

Primary Examiner—Daniel M. Yasich
Attorney, Agent, or Firm—Jordan and Hamburg

[57] ABSTRACT

A method for the contactless measuring of the temperature of objects with a changing proportion of differently emitting surfaces having the same temperature by means of a multi-channel pyrometer, for example, for pyrometric measurements, on which there are different amounts of residues of the material to be processed. The spectral signal voltages $U_{ij}$ are ascertained as a function of the difference $U_{oj} - U_{uj}$ for the $i = 1$ to m surfaces of the object differing in emissivity, at least m spectral signal voltages $U_j$ are measured and the object temperature is determined from the additive superimposition of the m radiation sources in the measurement location.

1 Claim, 4 Drawing Sheets

METHOD FOR THE CONTACTLESS MEASURING OF TEMPERATURE WITH A MULTI-CHANNEL PYROMETER

AREA OF APPLICATION OF THE INVENTION

The invention relates to a method for the contactless measuring of the temperature of objects with a variable proportion of differently emitting surfaces having the same temperature by means of a multi-channel pyrometer, for example, for pyrometric measurements on rotating rollers, on which there are different amounts of residues of the material to be processed.

CHARACTERISTICS OF THE KNOWN TECHNICAL SOLUTIONS

For the measurement cases described above pyrometric measurements with total-radiation and band-radiation pyrometers require artificial compensation for the emissivity with the help of matt varnishes or thin films. These measures can frequently be realized only within limitations. The other possibility of using peak-value memories to take into consideration the measurement of the material with the highest emissivity assumes that the measurement location is filled at least once during the total time of the measurement with respect to the material in question. The use of ratio pyrometers proves to be meaningful only when all materials radiate gray in the spectral measuring ranges, so that their mixed products also show a gray emissivity behavior. However, this is not the case in many applications.

OBJECT OF THE INVENTION

It is an object of the invention to provide a method for increasing the accuracy of measurement of a pyrometric temperature measurement for the above-mentioned applications.

EXPLANATION OF THE ESSENCE OF THE INVENTION

The invention is directed to the measurement of the temperature of an object, taking into consideration the portions of radiation coming from different surfaces.

This objective is accomplished in accordance with the invention by ascertaining the spectral signal voltages $U_{ij}$ as a function of the difference $U_{oj}-U_{uj}$ for the $i=1$ to m surfaces of the object differing in emissivity, measuring at least m spectral signal voltages $U_j$ and determining the object temperature from the additive superimposition of the m radiation sources in the measurement location.

The thermal radiation, emanating from a nontransparent material with the object temperature $T_o$ and an emissivity $\epsilon_{ij}$, is measured in the $j=1$ to n channels at the ambient temperature $T_u$ as a spectral signal voltage $$U_{ij} = \epsilon_{ij} U_{oj} + (1-\epsilon_{ij}) U_{uj} - U_{uj} \tag{1}$$

wherein, $U_{oj}$ and $U_{uj}$ are spectral signal voltages corresponding to the object and ambient temperatures $T_o$ and $T_u$ respectively. As is normally done with any pyrometer, the relationship between temperature and signal voltages is calibrated using a black-body radiator.

In addition, for each surface material occurring at the spectral object, the relationships $$\epsilon_{ij} = \frac{U_{ij}}{U_{oj} - U_{uj}} \tag{2}$$

are also calibrated. The temperature range to be expected for the particular application and the average temperature corresponding to this range are determined.

At these average temperatures, the signal voltages $U_{ij}$ for $i=1$ to m surface materials differing in emissivity are measured at a known surface temperature and stored.

In the particular application, the voltages $U_j$ for an unknown distribution of the m materials on the object and the unknown object temperature are measured. If the proportion of the ith material at the object surface is $a_i$ $$\sum_{i=1}^{m} a_i = 1 \tag{3}$$

then it follows from (1) that $$U_j = (a_1\epsilon_{1j} + a_2\epsilon_{2j} + \ldots + a_m\epsilon_{mj})(U_{oj} - U_{uj}) \tag{4}$$

Equations (3) and (4) represent a system of $n+1$ equations with m unknown surface material portions and the unknown object temperature. It can be solved uniquely for $m \leq n$, since the n unknown signal voltages $U_{oj}$ are assigned using the calibration curve in each case to one object temperature $T_o$. It is thus possible to rearrange the equation system according to the $U_{oj}$ and, in so doing, to eliminate the $a_i$, to insert the signal voltages determined from the second calibration for $\epsilon_{ij}$ and the $U_{uj}$ corresponding to the average ambient temperature $T_u$ and to solve the equation so obtained by inserting the $U_{oj}$ value pairs consecutively. One set of values inserted into the equation results in the best solution of the equation. The object temperature looked for corresponds to the set of values that resulted in the best solution. With this set of values, the temperature of the unknown surface portions $a_i$ can also be determined from equation (4).

EXAMPLE OF THE OPERATION

In the drawings

The temperature of an object of bare aluminum ($\epsilon \approx 0.1$), "contaminated" with soot ($\epsilon \approx 1$) was determined.

Figure 1:
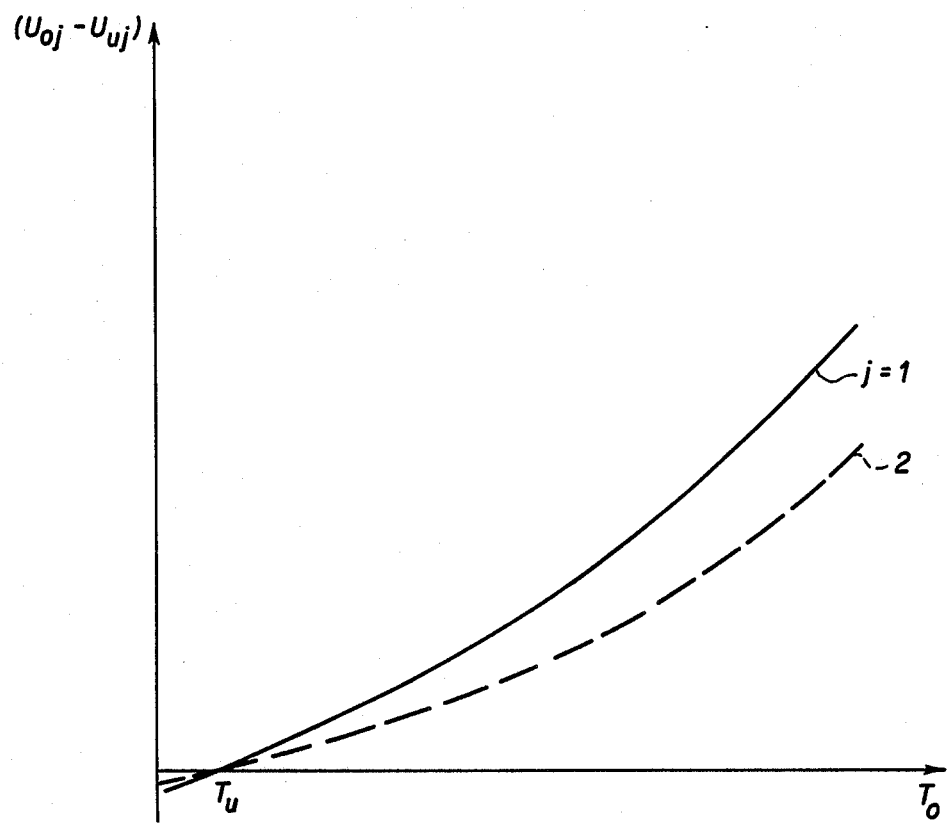
FIG. 1 shows the calibration lines of a 2-channel pyrometer for two spectral ranges.

The soot was distributed on different parts $a_i$ of the aluminum surface 10. The measurements were carried out with a 2-channel pyrometer 11. The usual calibration curves of FIG. 1 were already known. The signal voltages $U_{ij}$ were measured directly on the bare aluminum and on the soot at 100° C. and the spectral emissivities $\epsilon_{11}$, $\epsilon_{12}$, $\epsilon_{21}$ and $\epsilon_{22}$ were calculated from these voltages.

The 2-channel pyrometer was connected by way of an analog/digital converter 12 to a microcomputer 13. The corresponding values from the two spectral channels from the calibration curves of FIG. 1 were stored in the ROM. The calculated emissivities were stored in an additional (nonvolatile) RAM.

The logic of the equations (3) and (4) and method of solving them for $U_{oj}$ and $a_i$, including the iterative solution algorithm, were programmed. The evaluation of the differently "contaminated" material samples provided an object temperature of 85° C. and area portions in accordance with the given data with the error shown by curve 1 in FIG. 2.

Figure 4:
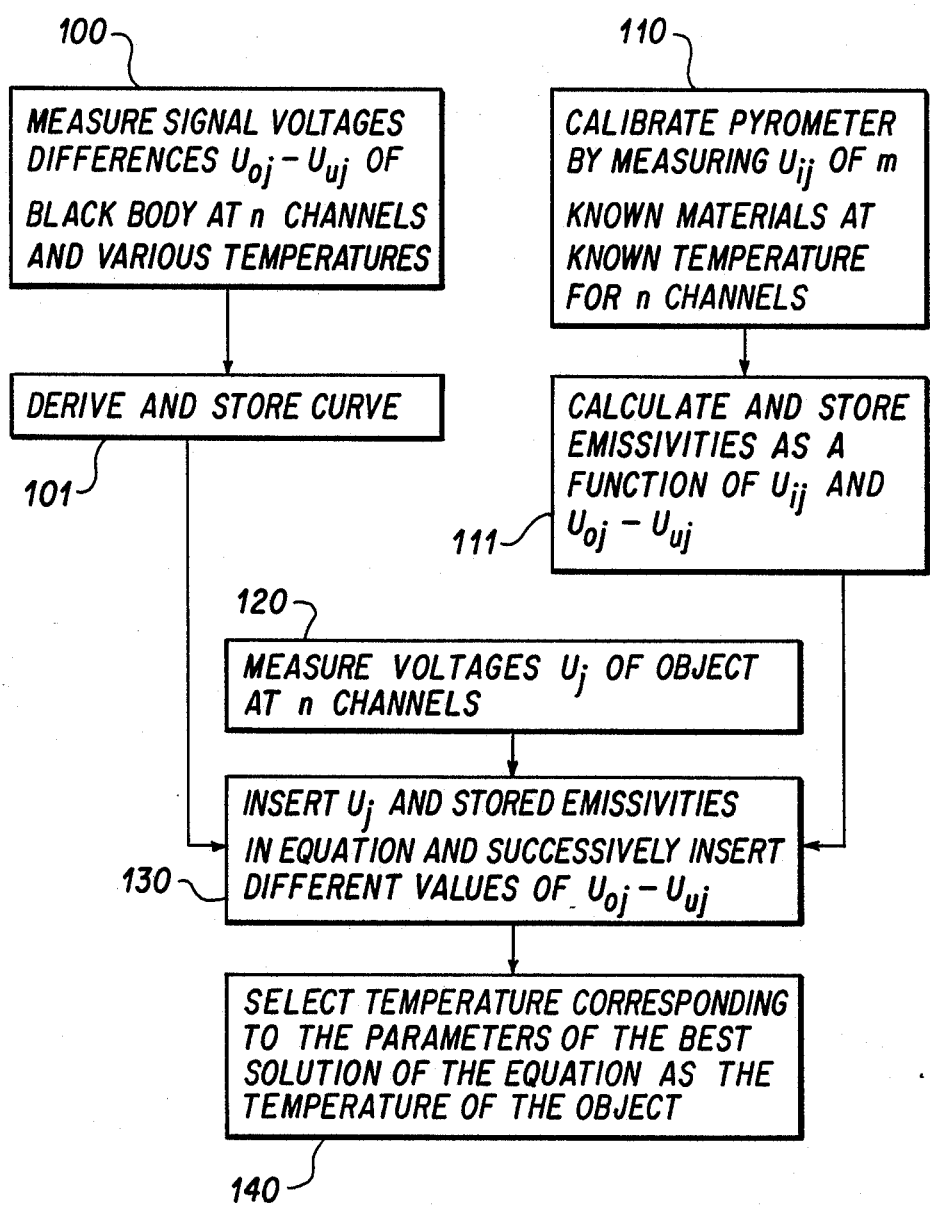
FIG. 4 is a flow diagram illustrating the method of the invention.

FIG. 4 illustrates, in simple form, the method of the invention. Thus, in blocks 100 and 101, data of the difference voltages and corresponding temperatures is taken from a black body, and stored. In blocks 110 and 111, a pyrometer is calibrated by measuring the voltage of m known materials, at a known temperature, and at n spectral channels, and the corresponding emissivities are calculated. In block 120, the calibrated pyrometer is employed to measure the voltages from an unknown object in the n spectral channels. The information from the stored data of block 101, the stored emissivities from block 111, and the measured voltages from the unknown object are inserted in the formula (in block 130), i.e. the formula (4). The insertion of the difference voltage from block 101 is done successively for differences corresponding to different temperatures, and, in block 140, the temperature corresponding to the closest solution to the equation is selected as the temperature of the object.

Figure 2:
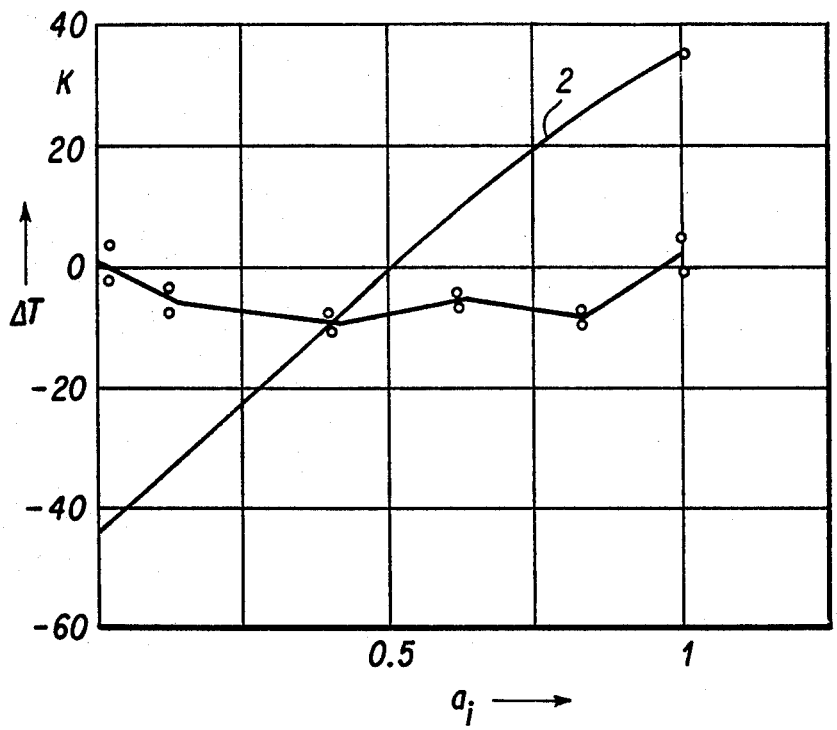
FIG. 2 shows the error curves of the measurement errors with a band-radiation pyrometer according to the method prior to the invention (curve 2) and with a 2-channel pyrometer according to the method of the invention.
Figure 3:
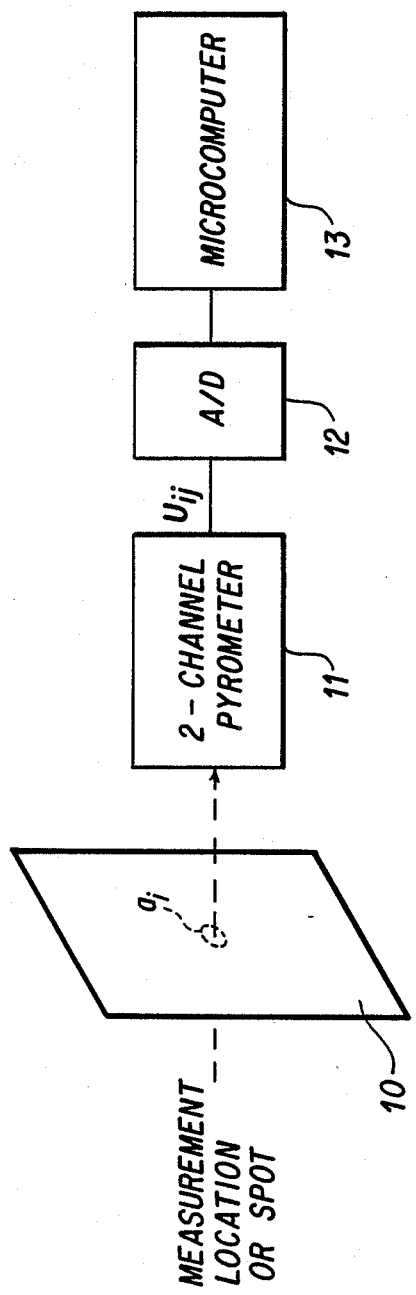
FIG. 3 is a block diagram of a system for performing the method of the invention.

For comparison with the method of the invention, the error, when the conventional band radiation pyrometer with the permanently set emissivity is used, is shown in curve 2 of FIG. 2.

We claim:

1. In a method for the contactless measurement of the temperature of an object with a plurality of surface components $a_i$ having i=1 to m differently emitting surface materials at the same temperature, including measuring the spectral signal voltages of a black body with a multi-channel pyrometer at j=1 to n spectral channels at a plurality of different temperatures to determine the characteristic curve of the relationship between the difference between the spectral signal voltages $U_{oj}-U_{uj}$ and the temperature of the black body at a plurality of various temperatures of the black body, and storing characteristic data corresponding to said curve, where m and n are integers, $U_{oj}$ is the portion of the signal voltage difference $U_{oj}-U_{uj}$ which depends upon the temperature $T_o$ of the black body, and $U_{uj}$ is the portion thereof which depends upon the known ambient temperature, the improvement wherein said method further comprises:

calibrating the pyrometer by measuring the signal voltages $U_{ij}$ of m known surface materials therewith at a known temperature, for each combinaion of i=1 to m surface materials and j=1 to n spectral channels, and calculating and storing the emissivities $\epsilon_{ij}$ specific to said known the surface materials in accordance with the equation:

$$\epsilon_{ij} = \frac{U_{ij}}{U_{oj} - U_{uj}}$$

using the measured values of $U_{ij}$ and said stored calibration data corresponding to the black body at said known respective temperature for the difference signal $U_{oj}-U_{uj}$;

measuring signal voltages $U_j$ from the object to be measured, in each of the j=1 to n spectral channels; and determining the object temperature of the body by successively inserting into the equation:
$$U_j = (a_1\epsilon_{1j} + a_2\epsilon_{2j} + \ldots + a_m\epsilon_{mj})(U_{oj} - U_{uj})$$

the differences $U_{oj}-U_{uj}$ from the stored calibrated data at each of a plurality of temperatures, as well as the stored emissivities $\epsilon_{ij}$, where the sum of all the surface components $a_i=1$ and $U_j$ are the signal voltages measured from the object, whereby the temperature of the object to be measured is the temperature corresponding to the stored calibration data which results in a solution to the last mentioned equation.

* * * * *